United States Patent [19]
Tsirkel

[11] Patent Number: 5,680,408
[45] Date of Patent: Oct. 21, 1997

[54] METHOD AND APPARATUS FOR DETERMINING A VALUE OF A MAJORITY OF OPERANDS

[75] Inventor: Aaron M. Tsirkel, San Jose, Calif.

[73] Assignee: Intel Corporation, Santa Clara, Calif.

[21] Appl. No.: 365,822

[22] Filed: Dec. 28, 1994

[51] Int. Cl.[6] .............. G06F 11/18; G06F 1/12; G06F 9/30
[52] U.S. Cl. ............ 371/36; 395/182.09; 395/551; 395/800
[58] Field of Search ............... 395/182.02, 800, 395/182.1, 183.21, 182.11, 550, 182.9, 183.09, 500, 439, 182.09, 551; 371/36, 35, 33, 20.1; 340/825.86; 364/DIG. 1, DIG. 2; 390/509, 345

[56] References Cited

U.S. PATENT DOCUMENTS

| | | | |
|---|---|---|---|
| 3,320,598 | 5/1967 | Star | 371/36 |
| 4,769,644 | 9/1988 | Frazier | 340/825.86 |
| 5,086,429 | 2/1992 | Gray et al. | 398/182.11 |
| 5,233,615 | 8/1993 | Goetz | 395/182.1 |
| 5,339,404 | 8/1994 | Vandling, III | 371/36 |
| 5,349,654 | 9/1994 | Bond et al. | 395/183.21 |
| 5,384,906 | 1/1995 | Horst | 395/550 |
| 5,515,282 | 5/1996 | Jackson | 371/36 |
| 5,537,655 | 7/1996 | Truong | 395/182.1 |

*Primary Examiner*—Daniel H. Pan
*Attorney, Agent, or Firm*—Blakely, Sokoloff, Taylor & Zafman

[57] ABSTRACT

A circuit for executing a logical majority operation in a computing system. The logical majority operation operates on multiple operands to determine the majority value of the operands. The circuit of the present invention includes circuitry for receiving multiple operands, logic for executing a logical majority operation in one clock cycle and circuitry for outputting a result of the logical majority operation.

13 Claims, 7 Drawing Sheets

METHOD AND APPARATUS FOR DETERMINING A VALUE OF A MAJORITY OF OPERANDS

FIELD OF THE INVENTION

The present invention relates to the field of computing systems. Specifically, the present invention relates to the execution of a logical majority operation in a computer system.

BACKGROUND OF THE INVENTION

Emerging technologies and advanced computer applications often require extensive use of logical computing functions. Examples of such advanced computer applications include handwriting and speech recognition, data recovery and error correction in high reliability communications systems, and evaluation of conditional branches in multi-pipeline systems. While computer systems are performing more and more complex functions, computer users continue to demand high performance and lower power usage. Thus, computer system and software designers look for ways to improve the execution speed of logical computing functions for digital signal processing.

Logical computing functions are not always optimized for rapid execution. In computer systems running applications requiring frequent execution of logical computing functions such as those mentioned above, there can be a significant impact on computer system performance. Thus, improvement in the execution speed of logical computing functions can improve computer system performance, especially where the logical computing functions are performed frequently.

An example of a complex operation for digital signal processing is an operation that produces a majority value of the input operands (a value that represents the value of the majority of the operands). This operation is referred to herein as a logical "majority" operation. For example, given three operands x1=0, x2=1, and x3=0, execution of a logical majority operation produces a result of 0 because 0 is the value corresponding to the majority of the operands. Similarly, applying a logical majority operation to operands x1=1, x2=1, and x3=0 produces a result of 1 as a majority of the operands are equal to 1. A logical majority operation may also be performed on a larger or smaller number of operands and is useful in a variety of applications including those mentioned above.

In prior art computer systems, a logical majority operation is performed using software, usually in the form of a software subroutine, combining several discrete CPU instructions. Thus, each logical majority operation requires multiple clock cycles to execute. In the above-mentioned applications, execution of logical majority operations may account for a significant portion of the application execution time. Thus, it is desirable to be able to perform a logical majority operation more quickly to improve computer system performance and thus, reduce computer system power usage.

As will be shown, the present invention provides an apparatus and method for executing a logical majority operation in one clock cycle. By performing a logical majority operation in one clock cycle, performance of applications and computer systems using a logical majority operation is improved. The present invention also provides a method and apparatus for executing a logical majority operation with a single CPU instruction.

SUMMARY OF THE INVENTION

A method and apparatus for executing a logical majority operation in a computing system is described. The computing system of the present invention performs operations that generate multiple operands. The present invention includes circuitry for receiving the multiple operands. The present invention also includes logic for computing the value that corresponds to the value of the majority of the operands such that a logical majority operation is executed in one clock cycle.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An apparatus and method for executing a logical majority operation in a computing system in one clock cycle is described. In the following description, numerous specific details such as numbers of operands, circuit implementations, computer system configurations, etc., are set forth in order to provide a thorough understanding of the present invention. However, it will be apparent to those skilled in the art that the present invention may be practiced without these specific details. In other instances, well-known structures have not been shown in detail in order to avoid obscuring the present invention.

Application of a Logical Majority Operation

As discussed above, the logical majority operation is useful in many different applications today. Multi-expert systems for speech and handwriting recognition provide good examples of the utility of the logical majority operation. Current speech and handwriting recognition technologies are not always accurate in interpreting and translating the data received. While one algorithm may be well suited for analysis of one type of data, another type of data may be analyzed more accurately with a different algorithm. Because data types are frequently mixed, it is often advantageous to employ multiple algorithms to analyze speech and handwriting data. Using the outputs of the various recognition algorithms as operands in a logical majority operation, the computer system is able to determine the result that represents the majority of the outputs of the recognition algorithms. This result is most likely to correspond to the best result in terms of recognizing the data. In this way, the logical majority operation improves recognition accuracy. The improvement provided by the use of the logical majority operation can be significant.

The logical majority operation can also be used in fault tolerant systems, data recovery and error correction systems, high reliability systems with duplicated parallel data transfer, military applications, and for evaluation of conditional branches in multi-pipeline processors. These applications can utilize the logical majority operation in much the same way as described with respect to speech and handwriting recognition systems. While these applications have been provided as examples, other applications of the logical majority operation will also be apparent to one of ordinary skill in the art.

As described above, the logical majority operation operates with a plurality of operands. The logical majority operation evaluates the operands to compute the value that represents the value of the majority of the operands. In one embodiment, the logical majority operation is a three operand logical majority operation. The three operand logical majority operation is represented in Table 1 below where x1, x2, and x3 represent the three input operands and Mj represents the result of the logical majority operation applied to the three input operands.

TABLE 1

Three Operand Logical Majority Operation

| x1 | x2 | x3 | Mj |
|----|----|----|----|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

To better illustrate the potential for frequent operation of a logical majority operation, it is helpful to refer again to a handwriting or voice recognition application as described above. In a handwriting or voice recognition application where a logical majority operation is used to determine the answer provided by multiple algorithms, a logical majority operation may be executed for several data points in each pattern. For example, for each letter that a handwriting recognition application evaluates, several data points must be compared, possibly using several different algorithms, to find the best pattern match. A logical majority operation is executed for each data point with the outputs of each of the different algorithms as input operands.

Figure 1:
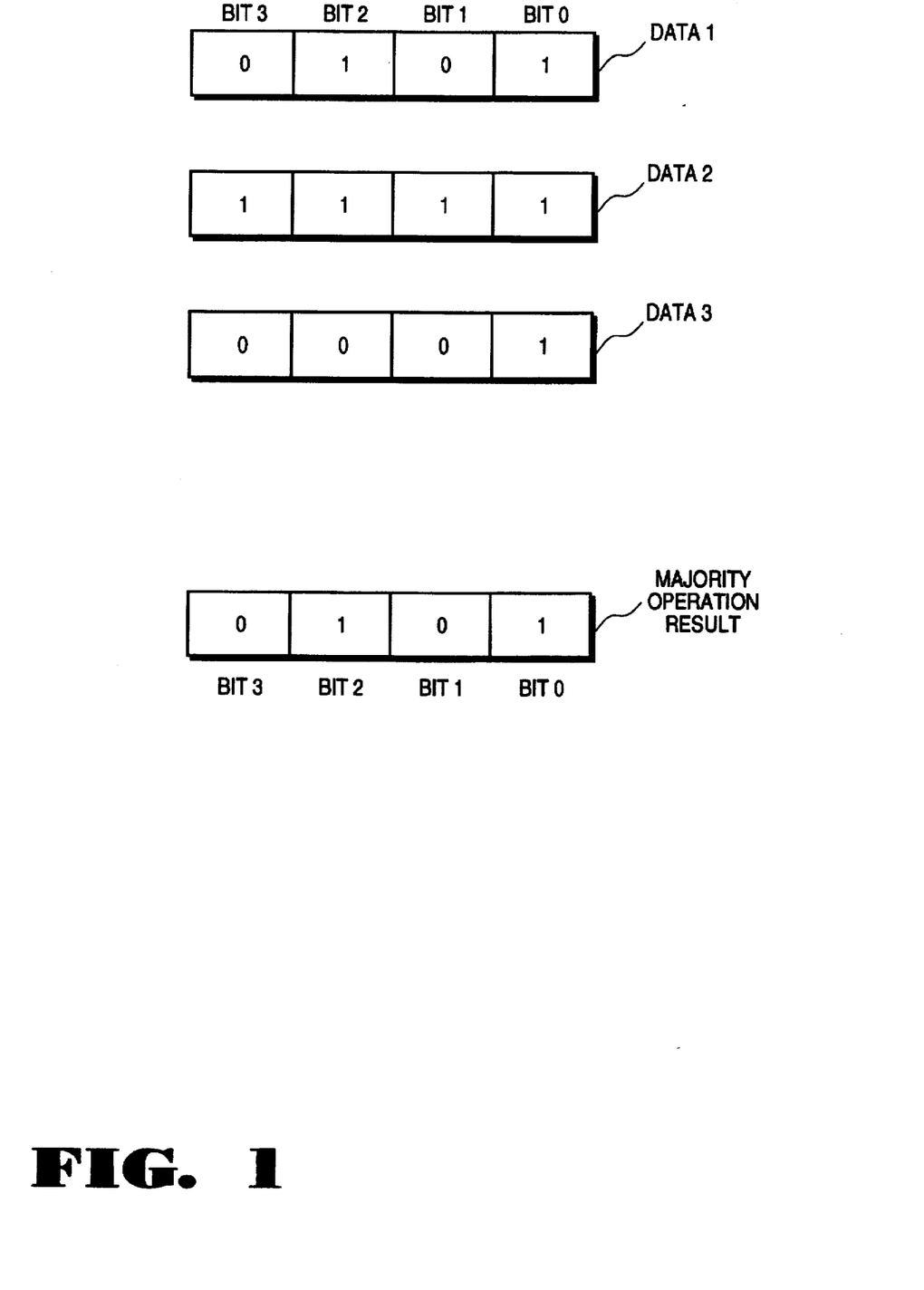
FIG. 1 illustrates an example of the application of a 3-operand logical majority operation to each bit of multi-bit data.

Additionally, the data analyzed may comprise multiple bits of information. In one embodiment of the present invention, a logical majority operation is executed for each bit of multi-bit information. For example, FIG. 1 illustrates three data items DATA 1, DATA 2, and DATA 3. Each data item comprises 4 bits labeled BIT 0, BIT 1, BIT 2 and BIT 3. In one embodiment, a logical majority operation is executed for each bit of the three data items producing a logical majority operation result as shown. In other words, BIT 0 of DATA 1, BIT 0 of DATA 2 and BIT 0 of DATA 3 provide the three input operands to one logical majority operation producing a result that is stored in BIT 0 of a logical majority operation result. BIT 1, BIT 2, and BIT 3 are similarly analyzed producing a four bit logical majority operation result as shown. Four bit data is used here for purposes of illustration, but data comprising any number of bits may be similarly evaluated using the logical majority operation of the present invention.

Thus, where several data points or multi-bit data are evaluated, a logical majority operation may be executed frequently.

Overview of the Computer System of the Present Invention

Figure 2:
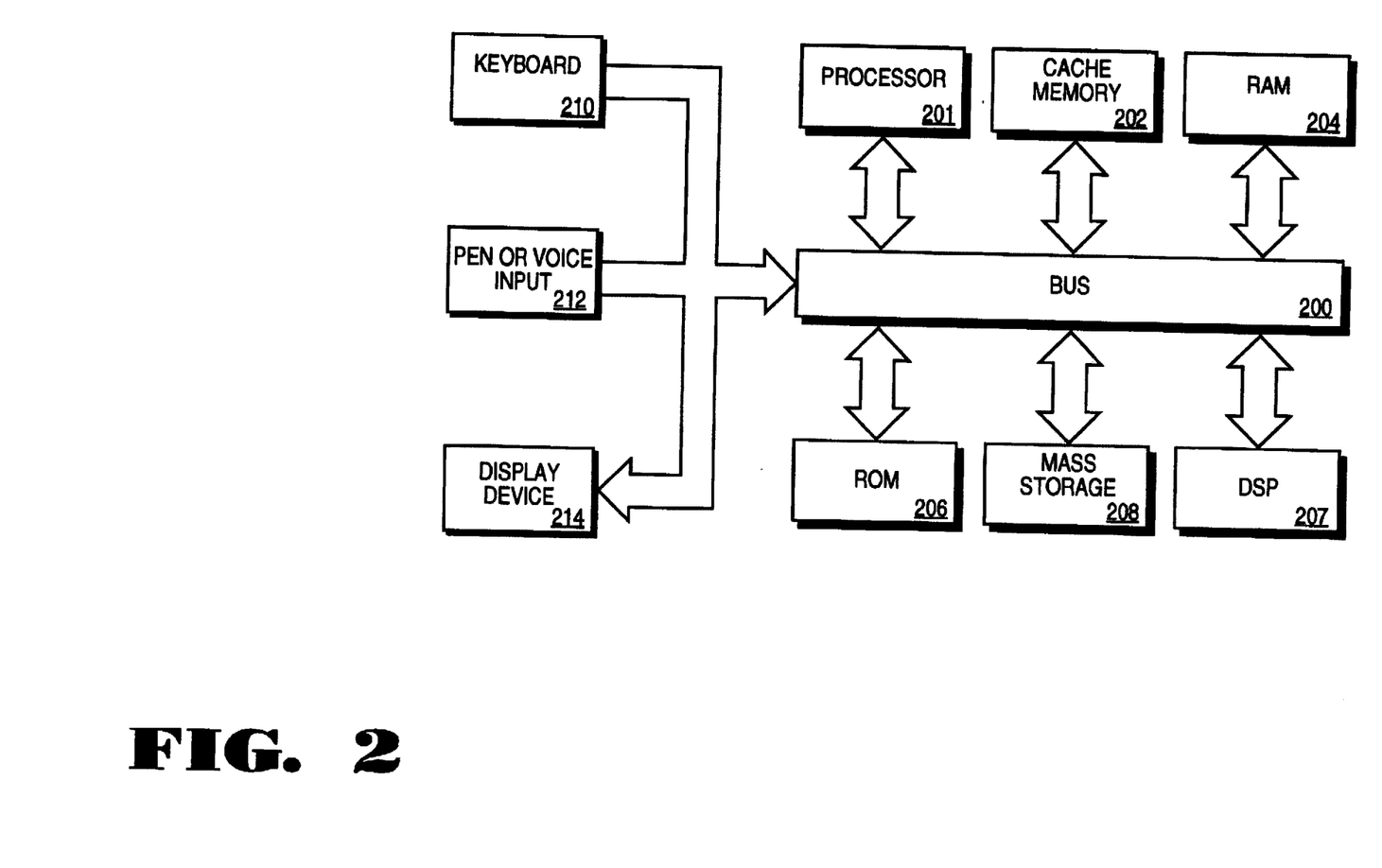
FIG. 2 is a block diagram of an overall system in which embodiments of the present invention may advantageously operate.

Referring to FIG. 2, one embodiment of a computer system in which the present invention operates is illustrated. Such computer systems, as illustrated in FIG. 2, comprise a bus 200 for communicating information, a processor 201 coupled with the bus 200 for processing information, a random access memory (RAM) 204 coupled with the processor 201 for storing information and instructions for the processor 201, and a read only memory (ROM) 206 coupled with the bus 200 for storing static information and instructions for processor 201.

The computer system of the present invention may also include a cache memory 202 coupled to bus 200 for storing frequently and/or recently used data for processor 201 and a digital signal processor (DSP) 207 for fast processing of specialized signals such as audio or video signals. DSP 207 may be configured on processor 201 or on a separate integrated circuit device. Optionally, the computer system of the present invention may also include mass storage device 208, display device 214 such as a cathode ray tube (CRT) or liquid crystal display (LCD), keyboard 210 or other input device and pen or voice input 212.

In one embodiment of the present invention, processor 201 is an Intel® Architecture Microprocessor such as manufactured by Intel Corporation of Santa Clara, Calif., the corporate assignee of the present invention. Other processors such as PowerPC™, Alpha™, etc. processors may also be used.

It will be apparent to those skilled in the art that other computer systems may be used with the present invention. Similarly, it will be apparent to those skilled in the art that the computer system illustrated in FIG. 2 may include additional components not illustrated in FIG. 2 or may be configured without components that are illustrated in FIG. 2.

The Processor of One Embodiment of the Present Invention

Figure 3:
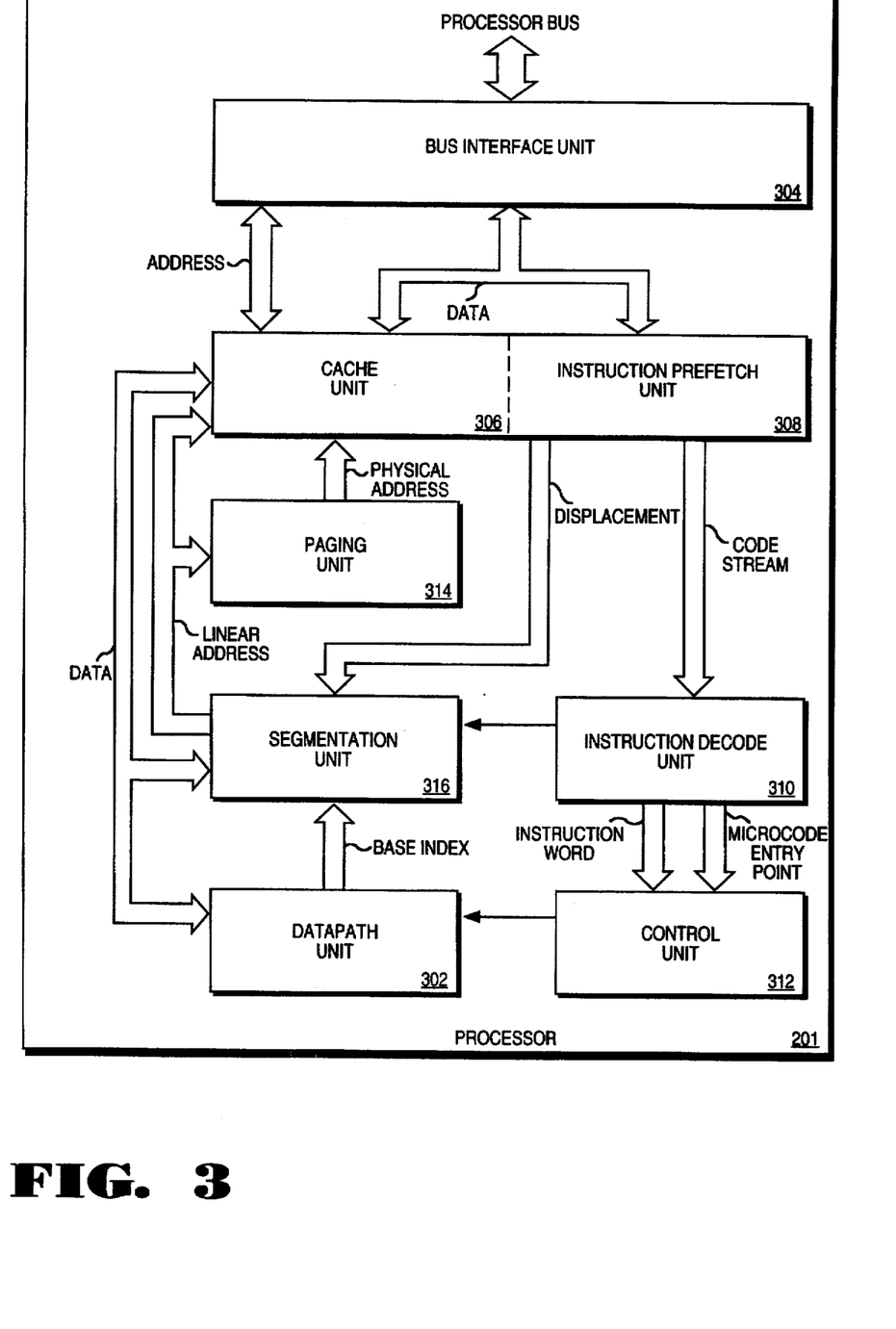
FIG. 3 illustrates the processor of one embodiment of the present invention.

Referring now to FIG. 3, one embodiment of the processor 201 of the present invention is illustrated. Processor 201 comprises a datapath unit 302 for performing the arithmetic and logical operations available in the instruction set of processor 201. Processor 201 also comprises bus interface unit 304 for communicating with bus 200 (FIG. 1), cache unit 306 coupled to bus interface unit 304 for storing frequently and/or recently used data or instructions, instruction prefetch unit 308 coupled to bus interface unit 304 for fetching instructions, instruction decode unit 310 coupled to instruction prefetch unit 308 for decoding instructions, control unit 312 coupled to instruction decode unit 310 for controlling instruction execution, paging unit 314 coupled to cache unit 306 and segmentation unit 316 coupled to instruction prefetch unit 308 and instruction decode unit 310. Paging unit 314 and segmentation unit 316 work together to control processing of computer system data and instructions in cooperation with memory. The operation and interaction of the functional blocks described above is well-known to those of ordinary skill in the art.

Figure 4:
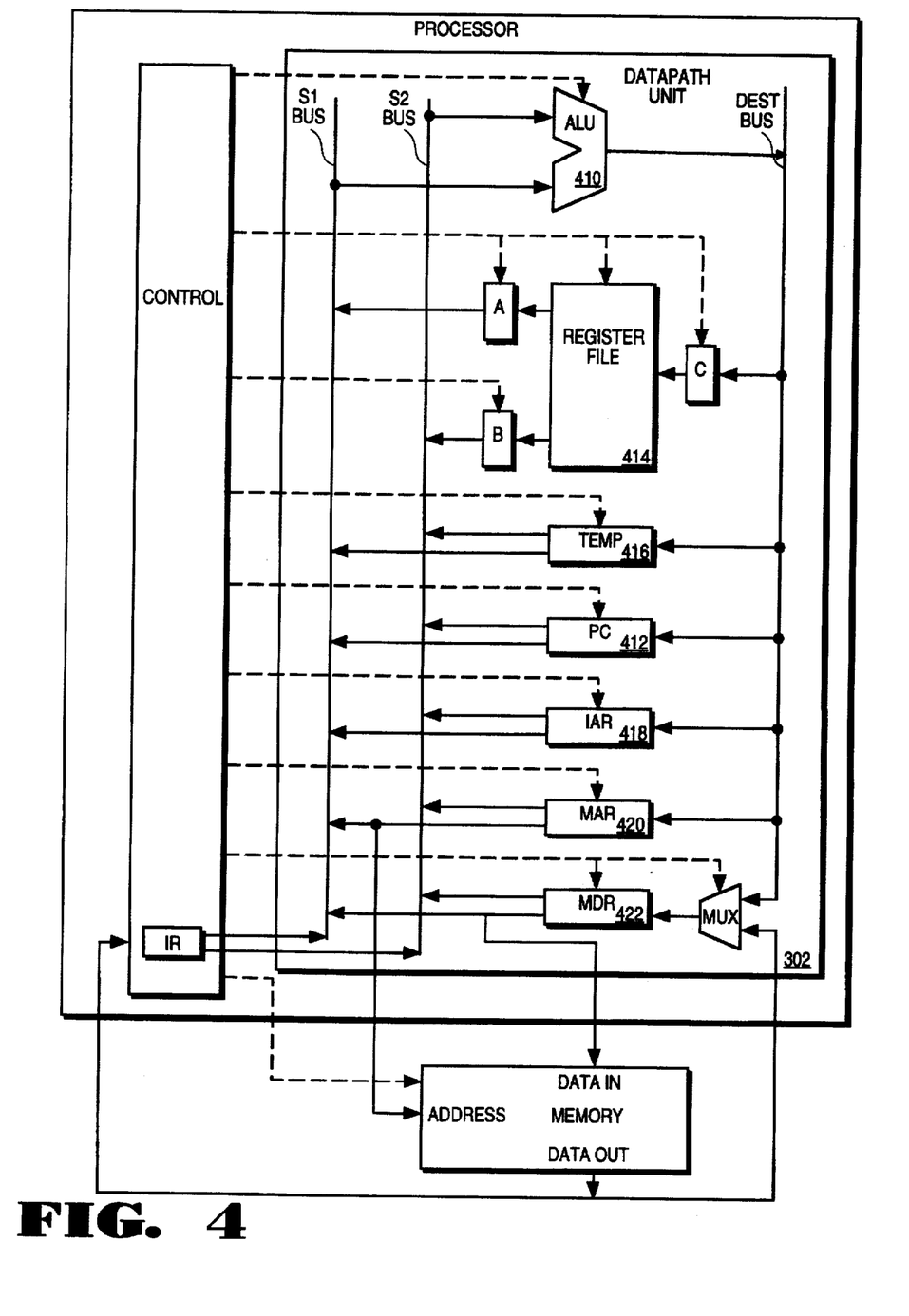
FIG. 4 illustrates the datapath unit of one embodiment of the present invention.

Referring now to FIG. 4, the datapath unit 302 of one embodiment of the present invention is shown in more detail. Datapath unit 302 performs all of the arithmetic and logical operations available in the instruction set of processor 201. Datapath unit 302 comprises an arithmetic logic unit (ALU) 410 for processing of arithmetic and logical functions, a program counter (PC) 412 to track instruction execution, a register file 414 containing the register state of the processor 201, general-purpose registers 416 and several specialized registers such as interrupt address register (IAR) 418, memory address register 420, and memory data register 422.

ALU 410 comprises logic to execute arithmetic and logical operations of processor 201. In one embodiment of the present invention, the logic for performing a logical majority operation is configured in ALU 410 of the datapath unit 302 of the present invention. This embodiment as well as the logic for performing a logical majority operation are described in more detail below with reference to FIG. 5.

The Circuit of the Present Invention

The output of a logical majority operation with respect to given inputs for a three operand logical majority operation is described above in reference to Table 1. The logical operation of a logical majority operation is more easily described through the use of a Boolean equation. A three operand logical majority operation can be represented by the Boolean equation below where Mj represents the logical majority operation and x1, x2, and x3 are the input operands.

Figure 5:
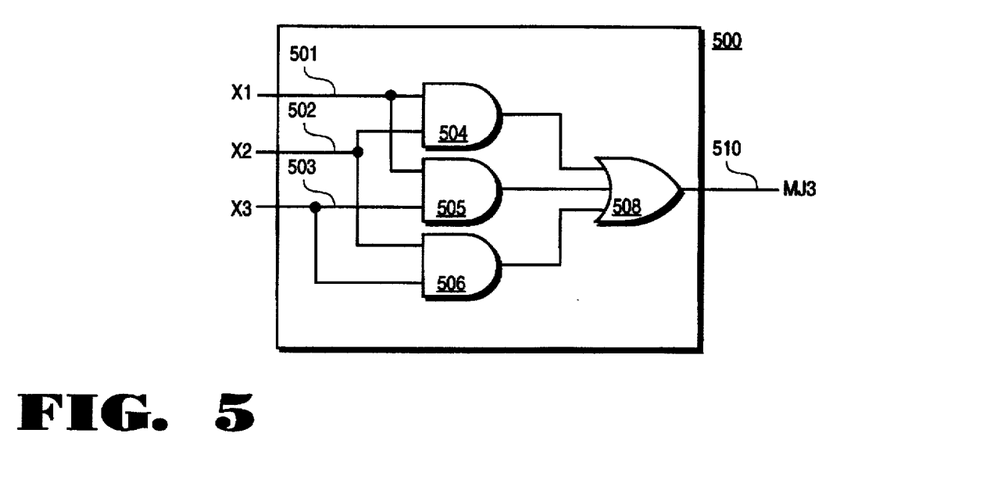
FIG. 5 illustrates one embodiment of a logical representation of the circuit of the present invention for a three operand logical majority operation.

$Mj\ (x1, x2, x3) = (\overline{x1}\ \text{AND}\ x2\ \text{AND}\ x3)\ \text{OR}\ (x1\ \text{AND}\ \overline{x2}\ \text{AND}\ x3)\ \text{OR}$ $(x1\ \text{AND}\ x2\ \text{AND}\ \overline{x3})\ \text{OR}\ (x1\ \text{AND}\ x2\ \text{AND}\ x3) =$ $(x1\ \text{AND}\ x2)\ \text{OR}\ (x1\ \text{AND}\ x3)\ \text{OR}\ (x2\ \text{AND}\ x3)$ Referring now to FIG. 5, the three operand majority operation circuit 500 of one embodiment of the present invention is implemented to operate according to the Boolean equation above. Input operands x1, x2 and x3 are received by majority operation circuit 500 on input lines 501–503 respectively. AND gates 504–506 and OR gate 508 determine the output of majority operation circuit 500 which is output on line 510. Majority operation circuit 500 executes a logical majority operation in one clock cycle. Translation of a logical diagram as illustrated in FIG. 5 into actual circuitry is well-known to those of ordinary skill in the art.

Figure 6:
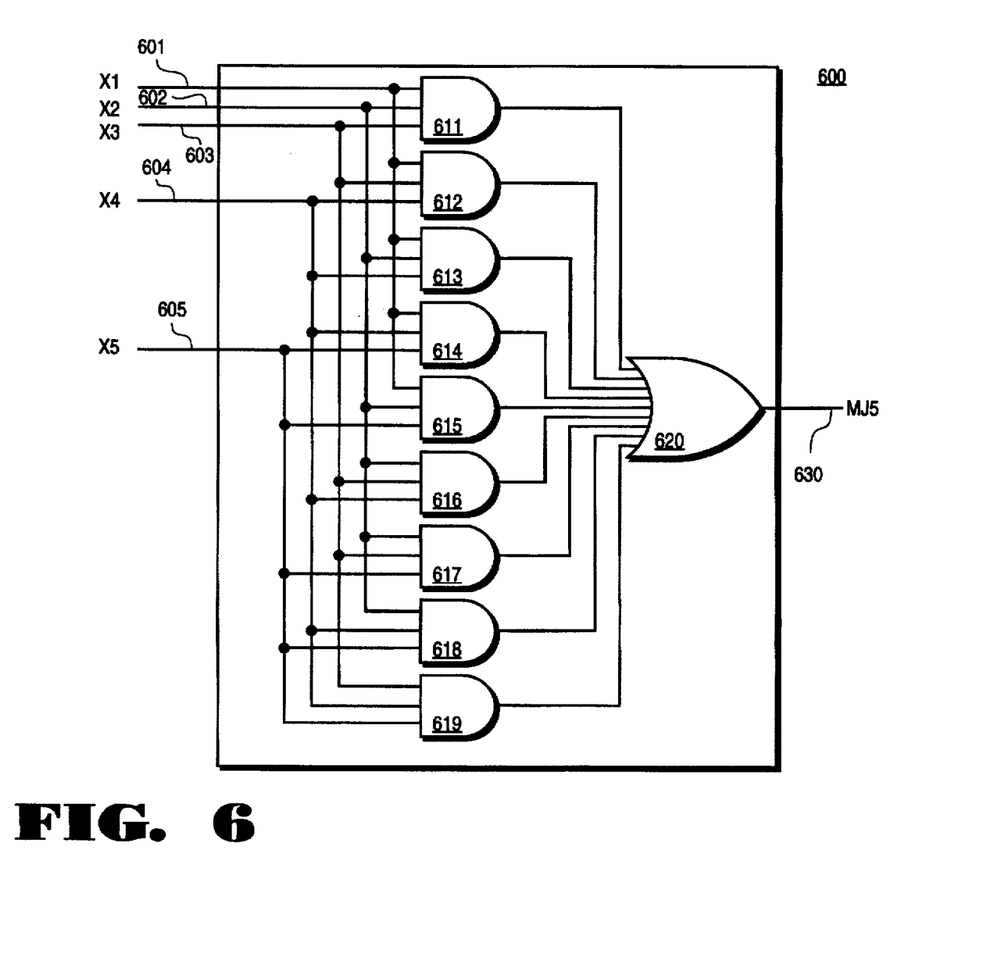
FIG. 6 illustrates one embodiment of a logical representation of the circuit of the present invention for a five operand logical majority operation.

In an alternative embodiment of the present invention, the logical majority operation of the present invention operates on five input operands. A five operand logical majority operation determines the value that represents the majority of the five input operands. For example, input operands x1=0, x2=1, x3=1, x4=0, and x5=1 produce a result of Mj=1 as the majority of the input operands have a value of 1. The Boolean equation, referred to as Equation (2) herein, for the five operand logical majority operation is:

$Mj\ (x1, x2, x3, x4, x5) =$ $(x1\ \text{AND}\ x2\ \text{AND}\ x3)\ \text{OR}\ (x1\ \text{AND}\ x3\ \text{AND}\ x4)\ \text{OR}$ $(x1\ \text{AND}\ x4\ \text{AND}\ x5)\ \text{OR}\ (x1\ \text{AND}\ x2\ \text{AND}\ x4)\ \text{OR}$ $(x1\ \text{AND}\ x2\ \text{AND}\ x5)\ \text{OR}\ (x2\ \text{AND}\ x3\ \text{AND}\ x4)\ \text{OR}$ $(x2\ \text{AND}\ x3\ \text{AND}\ x5)\ \text{OR}\ (x2\ \text{AND}\ x4\ \text{AND}\ x5)\ \text{OR}$ $(x3\ \text{AND}\ x4\ \text{AND}\ x5)$ Referring now to FIG. 6, the majority operation circuit 600 of one embodiment of the present invention is implemented to operate according to the Boolean equation above. Input operands x1, x2, x3, x4 and x5 are received by majority operation circuit 600 on input lines 601–605 respectively. AND gates 611–619 and OR gate 620 determine the output of circuit 600 which is output on line 630. Majority operation circuit 600 for a five operand logical majority operation also executes a logical majority operation in one clock cycle.

Although three and five operand logical majority operations are described herein as embodiments of the present invention, the logical majority operation may have any odd number of operands. The logical diagram for a logical majority operation with a larger number of operands comprises additional logical elements in a different configuration.

In one embodiment, as mentioned above, the majority operation circuit of the present invention is configured as dedicated logic in the ALU 410 of the datapath unit 302. In this embodiment, the majority operation circuit is designed into the ALU 410 during the design phase of the processor 201. Additionally, the logical majority operation is defined in the instruction decode unit 310 (FIG. 3) in firmware such that a logical majority operation is invoked using a single CPU instruction.

In another embodiment, the majority operation circuit of one embodiment of the present invention is configured on DSP 207 (FIG. 2). In this embodiment as in the embodiment described above, the majority operation circuit is designed into the DSP during the design phase of the integrated circuit. The majority operation circuit according to this embodiment also executes a logical majority operation in one clock cycle.

Figure 7:
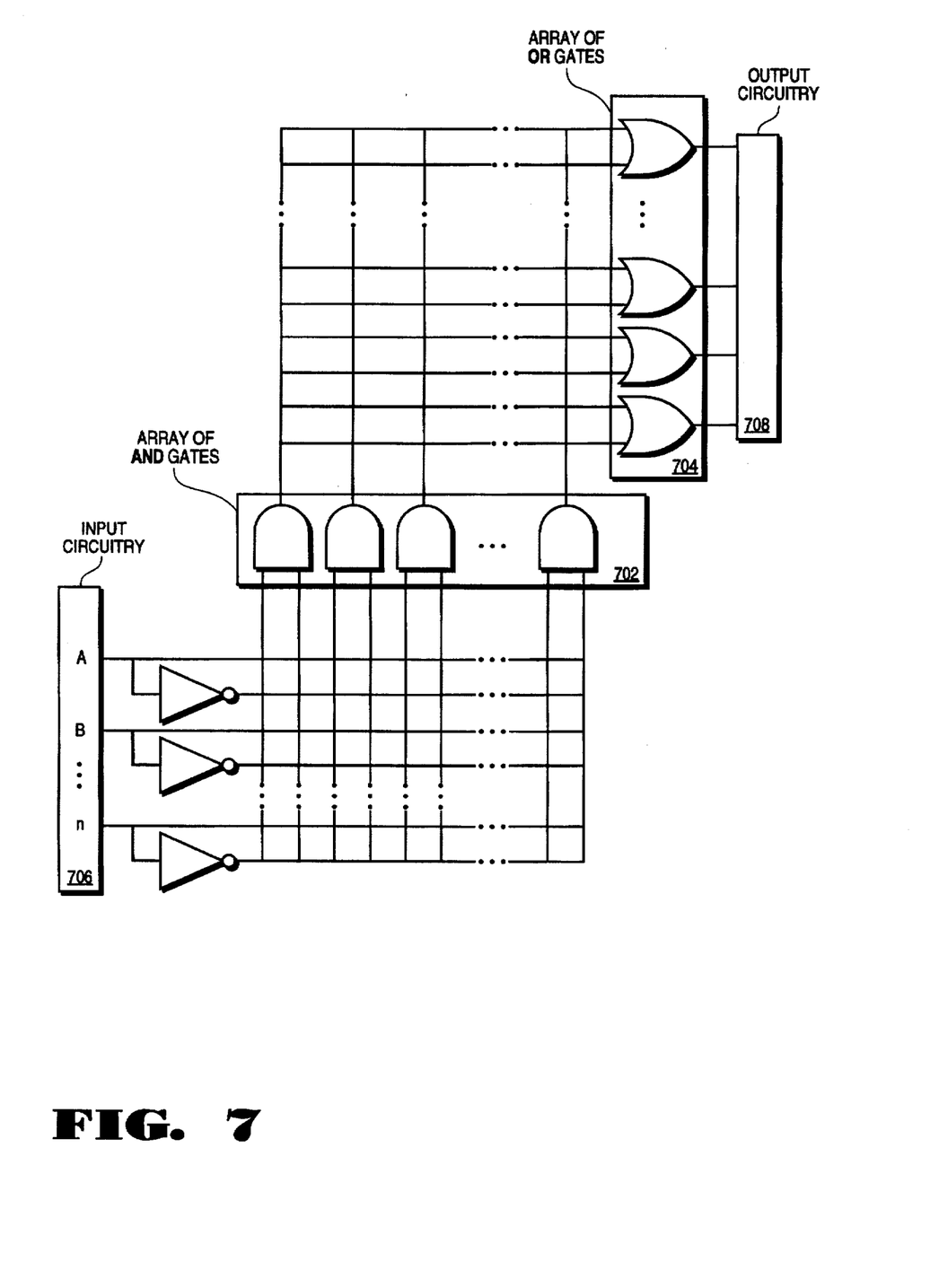
FIG. 7 illustrates a programmable logic array (PLA) as may be used to implement one embodiment of the present invention

In another embodiment, the majority operation circuit of the present invention is configured on a programmable logic array (PLA) that is programmed according to the equation above. FIG. 7 illustrates an example of a PLA 700 in which one embodiment of the circuit of the present invention may be configured. PLA 700 comprises transistors which form an array of logical "AND" gates 702 and an array of logical "OR" gates 704 along with other general purpose input 706 and output 707 circuitry. Before PLA 700 is programmed, the arrays of "AND" 702 and "OR" 704 gates are not electrically connected. PLA 700 is then programmed according to a Boolean equation in a "sum-of-products" form (as shown above). This programming determines the appropriate connections between the "AND" 702 and "OR" 704 gates of the arrays within PLA 700 to form the required circuit. The programmed PLA is then coupled to the processor 201 (FIG. 2) in the computer system of the present invention. The majority operation circuit of the present invention configured on PLA 700 also executes a logical majority operation in one clock cycle.

Figure 8:
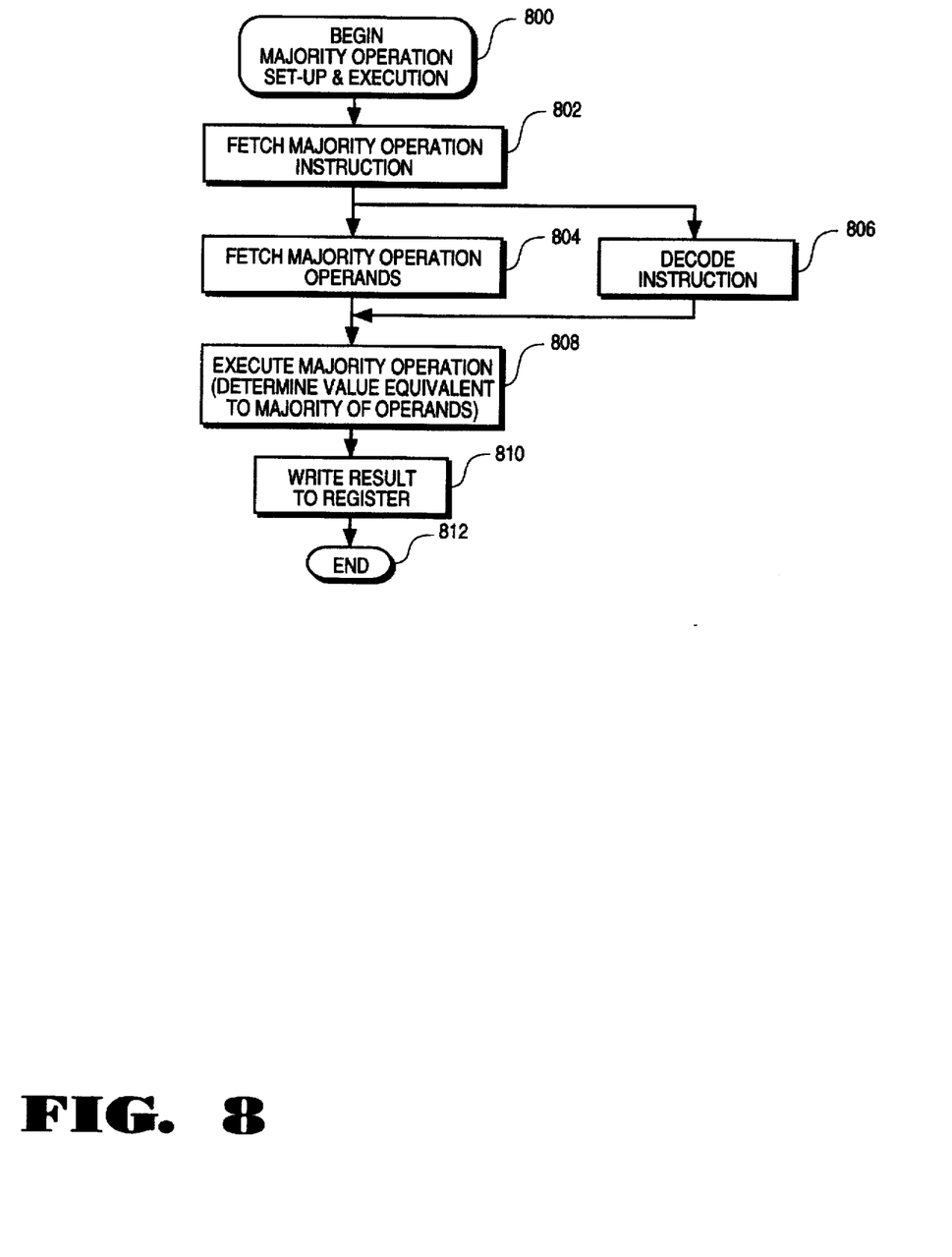
FIG. 8 is a block diagram illustrating the method of one embodiment of the present invention.

Referring now to FIG. 8, the method of one embodiment of the present invention is illustrated. The method of the present invention begins at processing block 800. At processing block 802, the instruction prefetch unit or other logic fetches the instruction to execute a logical majority operation. Then in parallel, the method of the present invention fetches the input operands for the logical majority operation from processor registers in processing block 804 and decodes the instruction in the instruction decode unit in processing block 806. In processing block 808, the method of the present invention executes a logical majority operation (determines the value that is equivalent to the value of the majority of the operands). In processing block 810, the result of the logical majority operation is written to memory or the appropriate register. The method of the present invention ends at processing block 812. It should be noted that fetching, decoding, and writing the result of the logical majority operation, as with other CPU instructions, may require additional clock cycles.

Whereas many alterations and modifications of the present invention will no doubt become apparent to a person of ordinary skill in the art after having read the foregoing description, it is understood that the particular embodiments shown and described by way of illustration are in no way intended to be considered limiting. Therefore, references to details of the preferred embodiment are not intended to limit the scope of the claims which themselves recite only those features regarded as essential to the invention.

Thus, an apparatus and method for executing a logical majority operation in a computing system in one clock cycle has been described.

I claim:

1. A method for executing a logical majority operation in a computer system including a processor, the method comprising steps of:

fetching a logical majority operation instruction;

fetching a plurality of operands from registers in said computer system;

decoding said logical majority operation instruction;

receiving the plurality of operands;

determining a value that represents the value of a majority of said plurality of operands; and outputting said value such that said logical majority operation is executed in one instruction cycle.

2. The method as defined in claim 1 wherein said input circuitry receives a predetermined, odd number of operands.

3. The method as defined in claim 2 wherein said predetermined number is three.

4. The method as defined in claim 3 wherein said value is determined according to the following Boolean equation:

$$Mj(x1,x2,x3)=(x1 \text{ AND } x2) \text{ OR } (x1 \text{ AND } x3) \text{ OR } (x2 \text{ AND } x3)$$

wherein Mj represents the value of the majority of said operands and said operands are represented by x1, x2, and x3.

5. The method as defined in claim 2 wherein said predetermined number is five.

6. The method as defined in claim 5 wherein said value is determined according to the following Boolean equation:

$$Mj (x1, x2, x3, x4, x5) =$$
$$(x1 \text{ AND } x2 \text{ AND } x3) \text{ OR } (x1 \text{ AND } x3 \text{ AND } x4) \text{ OR }$$
$$(x1 \text{ AND } x4 \text{ AND } x5) \text{ OR } (x1 \text{ AND } x2 \text{ AND } x4) \text{ OR }$$
$$(x1 \text{ AND } x2 \text{ AND } x5) \text{ OR } (x2 \text{ AND } x3 \text{ AND } x4) \text{ OR }$$
$$(x2 \text{ AND } x3 \text{ AND } x5) \text{ OR } (x2 \text{ AND } x4 \text{ AND } x5) \text{ OR }$$
$$(x3 \text{ AND } x4 \text{ AND } x5)$$

wherein Mj represents the value of the majority of said operands and said operands are represented by x1, x2, x3, x4 and x5.

7. The method as set forth in claim 1 wherein said step of determining is performed by the processor.

8. The method as set forth in claim 1 wherein said step of determining is performed by a digital signal processor.

9. The method as set forth in claim 1 wherein said step of determining is performed by a programmable logic array.

10. A computer system comprising:

a bus to communicate information;

a memory coupled to said bus to store information; and a processor coupled to said bus to process information, said processor including:

an instruction prefetch unit to fetch a logical majority operation, an instruction decode unit to decode said logical majority operation, a register file to store a plurality of operands, and an arithmetic logic unit (ALU) to execute said logical majority operation, said ALU receiving an odd number of operands fetched from said register file and executing said logical majority operation to determine a value corresponding to a value of a majority of said odd number of operands.

11. The computer system as set forth in claim 10 wherein said processor is a digital signal processor (DSP).

12. The computer system as set forth in claim 10 wherein said odd number of operands is three and said value is determined according to the following Boolean equation:

$$Mj(x1,x2,x3)=(x1 \text{ AND } x2) \text{ OR } (x1 \text{ AND } x3) \text{ OR } (x2 \text{ AND } x3)$$

wherein Mj represents said value of said majority of said operands and said operands are represented by x1, x2, and x3.

13. The computer system as set forth in claim 10 wherein said odd number is five and said value is determined according to the following Boolean equation:

$$Mj (x1, x2, x3, x4, x5) =$$
$$(x1 \text{ AND } x2 \text{ AND } x3) \text{ OR } (x1 \text{ AND } x3 \text{ AND } x4) \text{ OR }$$
$$(x1 \text{ AND } x4 \text{ AND } x5) \text{ OR } (x1 \text{ AND } x2 \text{ AND } x4) \text{ OR }$$
$$(x1 \text{ AND } x2 \text{ AND } x5) \text{ OR } (x2 \text{ AND } x3 \text{ AND } x4) \text{ OR }$$
$$(x2 \text{ AND } x3 \text{ AND } x5) \text{ OR } (x2 \text{ AND } x4 \text{ AND } x5) \text{ OR }$$
$$(x3 \text{ AND } x4 \text{ AND } x5)$$

wherein Mj represents the value of the majority of said operands and said operands are represented by x1, x2, x3, x4 and x5.

* * * * *